March 19, 1963 P. H. PELLEY 3,081,579
CANOPY CONSTRUCTION
Filed Oct. 22, 1959
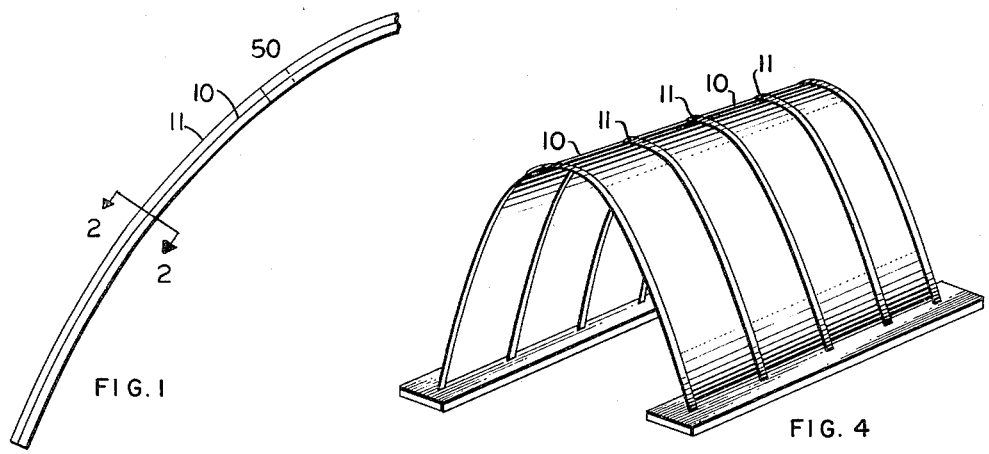
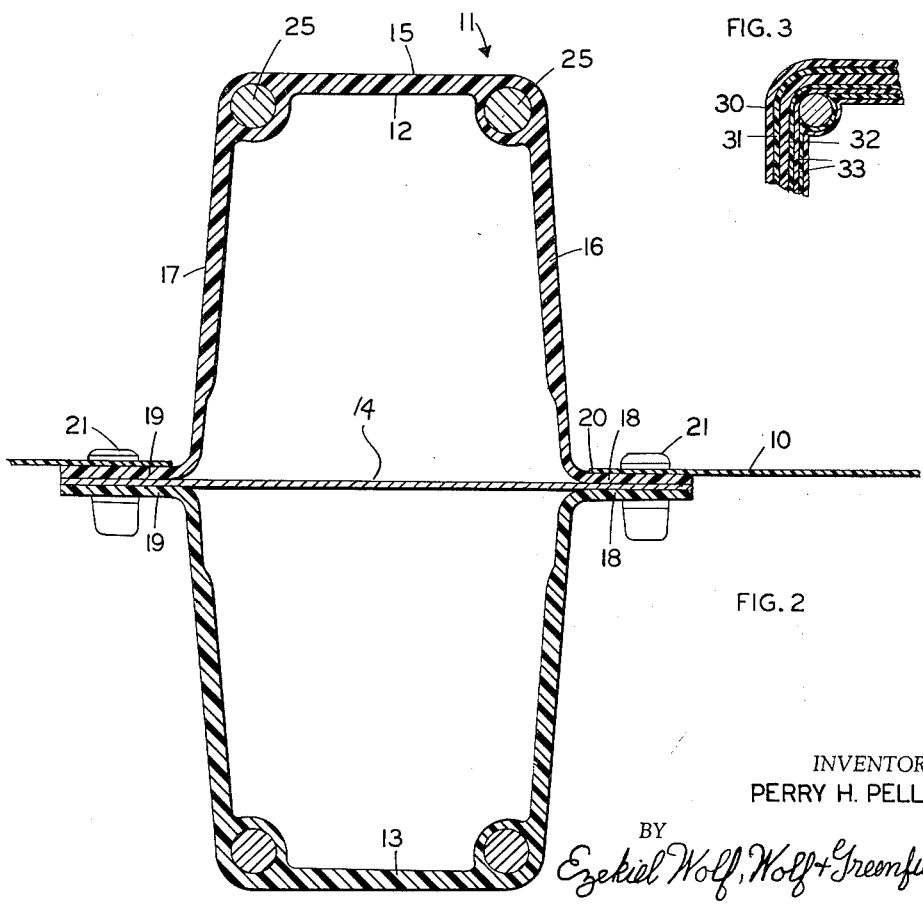
INVENTOR.
PERRY H. PELLEY
BY
Ezekiel Wolf, Wolf + Greenfield
ATTORNEYS

United States Patent Office 3,081,579
Patented Mar. 19, 1963

3,081,579
CANOPY CONSTRUCTION
Perry H. Pelley, Wichita, Kans., assignor to Tru-Scale,
Inc., Wichita, Kans., a corporation of Kansas
Filed Oct. 22, 1959, Ser. No. 848,014
1 Claim. (Cl. 50—61)

The present invention relates to a novel outdoor canopy construction of particular utility in areas where the canopy is subject to substantial forces of wind.

The design of the present invention has particular utility for such uses as a canopy for gasoline pumps in a gasoline service station. The canopy is formed substantially entirely of light transmitting panels or skins supported by opaque parabolic beams. The beams are preferably reinforced polyester laminates arranged and shaped as parabolics. Each supporting beam has two parallel parabolic opposing members, symmetrical in cross section with a cross web sandwiched therebetween. Each opposing member has outwardly flared flanges at its side edges adapted to be secured against the cross web and facing the flanges of the opposing member.

These and other objects and advantages of the present invention will be more clearly understood when considered in conjunction with the accompanying drawing which illustrates the specific embodiments of the present invention, and in which:

FIG. 1 is an end view of the canopy,

FIG. 2 is a fragmentary cross sectional detail taken substantially along the line 2—2 of FIG. 1, FIG. 3 is a schematic detail of the composition forming the beams, and FIG. 4 is a perspective view of the canopy.

A plurality of rectangular skins 10 are bent into a substantially parabolic form as illustrated in FIG. 1. Skins 10 are all coplanar and supported adjacent one another by the intermediate beams 11.

Skins 10 may be formed of fiber glass reinforced synthetic resins or similar composition. If a synthetic resin as used, it may, for example, be a polymerized methyl methacrylate resin reinforced with a glass matting or a woven glass fabric.

The reinforcing beams have a parabolic outer member 12 and a parabolic inner member 13 symmetrical in cross section and secured to opposite sides of a cross web 14.

Each member 12 and 13 is formed of fiber glass and synthetic resin laminates of substantially a U-shaped cross section having side walls 16 and 17, bight 15 and outwardly flared flanges 18 and 19 respectively continuous with the sidewalls 16 and 17. A cross web 14 is sandwiched between opposite flanges 18 and 19. The edges 20 of the skins 10 lay in face to face relation with the outer surface of flange 18 of the outer member 12. The pairs of outwardly flared flanges, cross web 14 and skin 10 are secured together in sandwich fashion by a series of fasteners 21 which project through openings formed in these elements. These fasteners 21 are spaced along the length of the flanges 18 and 19 at distances and in numbers depending upon the structural strength required for the particular canopy.

Each member 12 and 13 is preferably formed of laminations schematically illustrated in FIG. 3, which include an outer thin layer 30 of a pigmented polymerized polyester resin. Immediately below this layer is a light-weight glass cloth or mat 31 impregnated with polymerized polyester resin compatible with the first mentioned layer. Immediately below the light-weight glass cloth or mat 31 is another layer 32 of the same construction as layer 30. Below this third layer 32 is a series of layers of heavy fiber glass matting or woven fabric 33 which imparts substantial reinforcing strength to the lamination. Intermediate these fiber glass layers 33 are the reinforcing steel rods 25 located at the juncture of the bight 15 and side walls 16 and 17. The fiber glass mattings 33 may be thoroughly impregnated with a polyester resin of the same type as layer 30 and 32.

Each of the members 12 and 13 may be formed by partially polymerizing a pair of sheets 30, 32 of polyester resin, such as methyl methacrylate to a gel consistency. These sheets are then arranged in sandwich fashion with an intermediate layer of a mat or glass cloth 31 impregnated with the same polyester material as sheets 30, 32. This mat 31 is preferably a light-weight glass cloth material. Additional layers 33 of fiber glass are positioned below one of the gel layers. These various layers are layed into a U-shaped mold with lengths of reinforcing steel rods intermediate the layers 33. The mold is closed and then polymerization is completed. A pair of members thus formed are then bonded to either side of the intermediate cross web 14 which may be formed of a glass impregnated fabric or some similar light-weight material which acts to prevent the side walls of the U-shaped member from spreading. If desired, the length of the U-shaped members 12 and 13 may be formed in several segments with members 12 and 13 lapped together for additional strength. Steel rods 25 need only extend upwardly to points 50 in such an arrangement. Steel rods extending at least ⅓ the length of the beams from each end withstand high loads and transmit such high concentrated loads to the supporting structure which may comprise parallel I beams, etc.

While a preferable embodiment includes the laminated beams as described such beams may in another embodiment be formed of metal suitably formed into the shapes as indicated.

What is claimed is:

A canopy construction comprising a plurality of parabolically formed skins coplanarly arranged with adjacent edges attached to parabolic supporting beams, each of said beams comprising a pair of segmented parallel members, U-shaped in cross section and having a reinforcing cross web of sheet material extending between facing side flanges thereof with the ends of opposing segments displaced longitudinally so that the facing flanges lap each other, each of said members being formed of a lamination including an outer layer of polymerized polyester resin, a layer of polymerized polyester-impregnated fiberglass mat, a second layer of polymerized polyester resin, and an innermost layer composed of a plurality of plies of polymerized polyester-impregnated fiberglass mats having metal reinforcing rods between the plies thereof and extending inwardly from the ends of said beams for approximately one-third the length thereof.

References Cited in the file of this patent

UNITED STATES PATENTS

| 2,328,197 | Cowin | Aug. 31, 1943 |
| 2,470,416 | Silver | May 17, 1949 |
| 2,688,580 | Fingerhut | Sept. 7, 1954 |
| 2,762,735 | Werner et al. | Sept. 11, 1956 |
| 2,784,763 | Shorts | Mar. 12, 1957 |
| 2,836,529 | Morris | May 27, 1958 |
| 2,870,793 | Bailey | Jan. 27, 1959 |
| 2,912,940 | Baroni | Nov. 17, 1959 |

FOREIGN PATENTS

| 798,610 | France | Mar. 10, 1936 |
| 504,405 | Great Britain | 1938 |
| 1,179,725 | France | Dec. 22, 1958 |